(12) United States Patent
Tabachnik (10) Patent No.: US 7,681,707 B2
(45) Date of Patent: Mar. 23, 2010

(54) DRAWERLESS POINT OF SALE SYSTEM AND ASSOCIATED METHODS

(76) Inventor: Bruce M. Tabachnik, 25815 Hendon Rd., Beachwood, OH (US) 44122

( * ) Notice: Subject to any disclaimer, the term of this patent is extended or adjusted under 35 U.S.C. 154(b) by 235 days.

(21) Appl. No.: 11/734,866

(22) Filed: Apr. 13, 2007

(65) Prior Publication Data

US 2007/0240966 A1    Oct. 18, 2007

Related U.S. Application Data (60) Provisional application No. 60/744,898, filed on Apr. 14, 2006.

(51) Int. Cl.
G07F 7/04    (2006.01)
(52) U.S. Cl. .................. 194/206; 194/229; 194/344; 194/346; 453/3; 453/18
(58) Field of Classification Search .............. 221/123, 221/124, 224, 236; 194/206, 207, 229, 302, 194/344, 346, 350
See application file for complete search history.

(56) References Cited

U.S. PATENT DOCUMENTS

| | | |
|---|---|---|
| 1,356,379 A | 10/1920 | McDermott |
| 2,805,675 A | 9/1957 | Noyes |
| 3,242,929 A | 3/1966 | Adams |
| 3,368,570 A | 2/1968 | Nagy et al |
| 3,603,503 A | 9/1971 | Kasper et al |
| 3,608,690 A | 9/1971 | Morrow et al. |
| 3,654,433 A | 4/1972 | Mendoza |
| 3,747,732 A | 7/1973 | Mitcheli |
| 3,828,166 A | 8/1974 | Johansson et al |
| 4,066,253 A | 1/1978 | Lundbald et al. |
| 4,070,564 A | 1/1978 | Tucker |
| 4,249,552 A | 2/1981 | Margolin et al. |
| 4,253,016 A | 2/1981 | Hirose |
| 4,310,885 A | 1/1982 | Azcua et al. |
| 4,347,924 A | 9/1982 | Hayashi et al. |
| 4,359,062 A | 11/1982 | Uecker et al. |

(Continued)

FOREIGN PATENT DOCUMENTS

JP    6266956    9/1994

(Continued)

OTHER PUBLICATIONS www.ecrsoft.com; "QUICKcheck: The Software-Centric Self-Checkout Solution"; 2006 ECR Software Corporation.

*Primary Examiner*—Jeffrey A Shapiro
(74) *Attorney, Agent, or Firm*—Mark R. Malek; Zies Widerman & Malek (57) ABSTRACT

A drawerless point of sale system includes a point of sale terminal and a currency changer device in communication with the point of sale terminal. The currency changer device is adapted to accept cash in bulk for a cash transaction and includes a housing, a coin accepting tray, a coin sorter, a plurality of respective coin bins, and a coin dispenser. The currency changer also includes a bill accepter/dispenser carried by the housing for accepting, sorting and dispensing bills, and a plurality of bill cassettes carried by the housing and in communication with the bill accepter/dispenser for receiving a respective plurality of similar bills from the bill accepter and for dispensing a respective plurality of bills responsive to said point of sale terminal.

19 Claims, 7 Drawing Sheets

U.S. PATENT DOCUMENTS

| | | |
|---|---|---|
| 4,479,049 A | 10/1984 | Hirose |
| 4,510,380 A | 4/1985 | Uchida et al. |
| 4,517,451 A | 5/1985 | Kokubo et al. |
| 4,538,057 A | 8/1985 | Iwagami et al. |
| 4,556,139 A | 12/1985 | Akagawa et al. |
| 4,558,712 A | 12/1985 | Sentoku et al. |
| 4,564,140 A | 1/1986 | Kokubo et al. |
| 4,571,489 A | 2/1986 | Watanabe |
| 4,596,924 A | 6/1986 | Watanabe |
| 4,602,332 A | 7/1986 | Hirose et al. |
| 4,625,870 A | 12/1986 | Nao et al. |
| 4,639,582 A | 1/1987 | Arikawa et al. |
| 4,697,071 A | 9/1987 | Hiraoka et al. |
| 4,817,041 A | 3/1989 | Sakamoto |
| 4,820,909 A | 4/1989 | Kawauchi et al. |
| 4,836,825 A | 6/1989 | Smeets et al. |
| 4,905,841 A | 3/1990 | Hirata et al. |
| 4,917,792 A | 4/1990 | Murakami |
| 4,967,896 A | 11/1990 | Hara |
| 4,972,958 A | 11/1990 | Ito et al. |
| 5,076,441 A | 12/1991 | Gerlier |
| 5,183,142 A | 2/1993 | Latchinian et al. |
| 5,184,708 A | 2/1993 | Levasseur |
| 5,313,050 A | 5/1994 | Hiroki et al. |
| 5,335,484 A | 8/1994 | Hain |
| 5,366,404 A | 11/1994 | Jones |
| 5,374,814 A | 12/1994 | Kako et al. |
| 5,504,313 A | 4/1996 | Kako et al. |
| 5,563,394 A | 10/1996 | Kako et al. |
| 5,606,157 A | 2/1997 | Awatsu et al. |
| 5,615,759 A | 4/1997 | Cadbury |
| 5,650,604 A | 7/1997 | Marcous et al. |
| 5,813,510 A | 9/1998 | Rademacher |
| 5,864,826 A | 1/1999 | Awatsu et al. |
| 5,869,826 A | 2/1999 | Eleftheriou |
| 5,896,975 A | 4/1999 | Lee |
| 5,900,607 A | 5/1999 | Awatsu et al. |
| 5,924,079 A | 7/1999 | Brown |
| 6,003,008 A | 12/1999 | Postrel et al. |
| 6,006,989 A | 12/1999 | Ademmer et al. |
| 6,012,633 A | 1/2000 | Ochiai et al. |
| 6,055,521 A | 4/2000 | Ramsey et al. |
| 6,128,402 A * | 10/2000 | Jones et al. ................. 382/135 |
| 6,167,381 A | 12/2000 | Swaine et al. |
| 6,356,805 B1 | 3/2002 | Fletcher |
| 6,536,664 B2 | 3/2003 | Nordqvist et al. |
| 6,550,583 B1 * | 4/2003 | Brenhouse ................... 186/66 |
| 6,567,722 B1 | 5/2003 | Menke |
| 6,601,686 B1 | 8/2003 | Ishida et al. |
| 6,607,124 B1 * | 8/2003 | Junkins et al. .............. 235/379 |
| 6,641,135 B1 | 11/2003 | Weinheimer |
| 6,811,078 B2 | 11/2004 | Workens |
| 6,842,115 B1 | 1/2005 | Harris et al. |
| 6,857,505 B1 | 2/2005 | Mason et al. |
| 6,889,850 B2 | 5/2005 | Amari |
| 6,910,697 B2 | 6/2005 | Varatharajah et al. |
| 6,981,633 B2 | 1/2006 | Inoue et al |
| 7,131,573 B2 | 11/2006 | Suzuki |
| 2003/0115103 A1 | 6/2003 | Mason |
| 2003/0121077 A1 | 6/2003 | Katou et al. |
| 2004/0134839 A1 | 7/2004 | Kobayashi et al. |
| 2004/0220859 A1 | 11/2004 | McGunn et al. |
| 2006/0073883 A1 | 4/2006 | Franks, Jr. |

FOREIGN PATENT DOCUMENTS

| | | |
|---|---|---|
| JP | 7192170 | 7/1995 |
| JP | 8221658 | 8/1996 |
| WO | WO 2005/044706 A1 | 5/2005 |

* cited by examiner

DRAWERLESS POINT OF SALE SYSTEM AND ASSOCIATED METHODS

RELATED APPLICATIONS

This application claims the benefit of U.S. Provisional Application Ser. No. 60/744,898 filed on Apr. 14, 2006, the contents of which are incorporated herein in its entirety.

FIELD OF THE INVENTION

The present invention relates to the field of point of sale systems and, more particularly, to the field of point of sale systems having drawerless currency changer devices, and related methods.

BACKGROUND OF THE INVENTION

Existing point of sale retail management systems accept many methods of payment including cash, credit card, gift card, and even checks. With respect to cash transactions, access to a cash drawer may be problematic with respect to security. More particularly, the opening of a cash drawer exposes cash intake to a cashier, or other user, in order to perform the steps of physically accepting cash and removing currency to provide change to the user.

In systems that do not utilize a cashier, i.e., self check-out systems, this is not as much of a problem. An example of such a system is disclosed in U.S. Pat. No. 6,857,505 to Mason, et al. Such a self-service check out terminal may be operated by a customer without the aid of a check-out clerk. Accordingly, during operation of the self-service check-out terminal, the customer may scan individual items for purchase across a scanner and then place the items for purchase into a bag or other transporting device. The customer may then pay for the purchase at the check-out terminal or at a central payment area staffed by an employee. The system includes a currency dispenser that dispenses an amount of change due to a customer in response to a dispenser control signal received from the processing unit. Such a unit, however, requires currency to be deposited in a sorted fashion. In other words, a customer must insert bills into the currency dispenser one at a time.

U.S. Pat. No. 5,606,157 to Awatsu, et al, discloses a cash processing system for automatically performing cash handling operations. Such a system is generally used in connection with automated teller machines (ATM's). The system includes a detachable cash safe that holds bills for a cash transaction. The system fails, however, to allow for cash bills to be deposited in bulk and separated accordingly.

U.S. Pat. No. 6,536,664 to Nordqvist, et al, discloses a payment processing system that enables retrofitting of an existing cash register with an automatic payment processing device. The system includes a payment processing device having a currency dispenser and a data port for assessing bank notes and coins and for supplying the proper amount of change to a user. This device also suffers from the deficiency of not being able to accept cash in bulk. In other words, a user must insert bills one at a time so that the bills can be identified and routed.

U.S. Pat. No. 5,924,079 to Brown discloses a cash register that prevents theft by restricting access to currency. The system includes a key pad for entering sales information, a currency receiving slot for receiving currency directly from a customer, an enclosed cash drawer coupled with the currency receiving slot for depositing the received currency and a currency dispensing tray responsive to the sales computing device for dispensing currency directly to the customer when the received currency amount exceeds the sales amount. Again, however, such a system does not allow a customer to deposit cash in bulk. Instead, the customer must deposit the currency individually, i.e., each bill must be deposited individually.

A point of sale terminal that accepts bank notes is also disclosed in U.S. Pat. No. 4,310,885 to Azcua, et al. This system includes a plurality of bill trays so that a user may separate and sort bank notes prior to inserting the bank notes into the point of sale terminal. U.S. Pat. No. 4,253,016 discloses an apparatus for dispensing and receiving bank notes. Such an apparatus, however, only accepts the bank notes one at a time.

SUMMARY OF THE INVENTION

In view of the foregoing background, it is therefore an object of the present invention to provide a drawerless point of sale system having enhanced efficiency. It is also an object of the present invention to provide a drawerless point of sale system that advantageously accepts currency in bulk. It is further an object of the present invention to provide a drawerless point of sale system that restricts access to cash. It is still further an object of the present invention to provide a drawerless point of sale system that is self replenishing.

These and other objects, features, and advantages in accordance with the present invention are provided by a drawerless point of sale system comprising a point of sale terminal and a currency changer device in communication with the point of sale terminal. The currency changer device is adapted to accept cash in bulk for a cash transaction, and to dispense change in a cash transaction responsive to commands received from the point of sale terminal.

The currency changer device comprises a housing, a coin accepting tray carried by the housing for accepting a plurality of coins in bulk, and a coin sorter carried by the housing and in communication with the coin accepting tray. The currency changer device also comprises a plurality of respective coin bins carried by the housing in communication with the coin sorter for receiving a respective plurality of similar coins from the sorted coins, and a coin dispenser carried by the housing and in communication with the plurality of respective coin bins to dispense coins in bulk responsive to the point of sale terminal.

The currency changer device further includes a bill accepter/dispenser carried by the housing for accepting and sorting a plurality of bills in bulk, and a plurality of bill cassettes carried by the housing and in communication with the bill accepter for receiving a respective plurality of similar bills from the bill accepter and for dispensing a respective plurality of bills responsive to the point of sale terminal. The currency changer device further includes a bill dispenser carried by the housing for dispensing a plurality of bills. Accordingly, the currency changer device advantageously allows a user to insert a plurality of unsorted coins in bulk and a plurality of unsorted bills in bulk, and sorts the coins and the bills into respective bins and bill cassettes, and dispenses change responsive to a command received from the point of sale terminal.

The point of sale terminal advantageously provides a signal to activate the currency changer device. Further, the point of sale terminal may provide data to the currency changer device. The data may include a predetermined amount of cash required to be tendered for a cash transaction and a predetermined amount of cash to be provided to a user as change.

The currency changer device may be adapted to be connected to at least one power supply carried by the housing. A communications link may be positioned between the point of sale terminal and the currency changer device.

The currency changer device may also include an indicator light and provide an indication to a user that the currency changer device is ready to accept currency. The system may include a pair of point of sale terminals in communication with the currency changer device. Further, the currency changer device may be self replenishing. Accordingly, the system may advantageously continue to operate without the need of a person accessing the cash held by the currency changer device to replenish it. A method aspect of the present invention is for using a drawerless point of sale system. The method may include determining a total amount of cash due in a cash transaction. The method may also include accepting cash in bulk responsive to commands received from the point of sale terminal. The method may further comprise dispensing change to a user responsive to commands received from the point of sale terminal.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
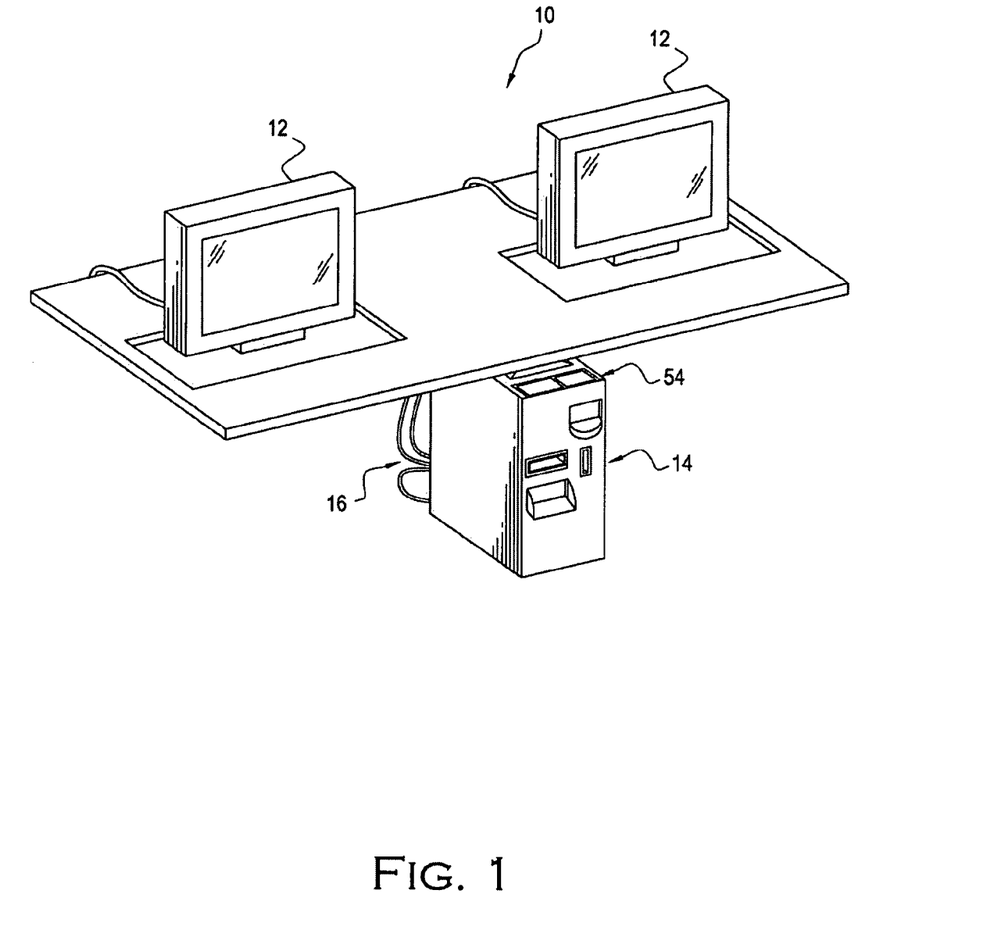
FIG. 1 is a perspective view of a drawerless point of sale system according to the present invention.

Referring initially to FIG. 1, a drawerless point of sale system 10 is now described in greater detail. The drawerless point of sale system 10 includes a point of sale terminal 12 and a currency changer device 14. As illustrated in FIG. 1, the drawerless point of sale system 10 may include more than one point of sale terminal 12. Accordingly, and as illustrated, a pair of point of sale terminals 12 may be connected to a single currency changer device 14. The system 10 of the present invention therefore advantageously enhances efficiency of point of sale retail management systems while simultaneously enhancing security of cash during cash transactions by preventing access to the cash.

The currency changer device 14 is preferably in communication with the point of sale terminals 12. More specifically, a communications link 16 extends from the currency changer device 14 to each point of sale terminal 12. The communications link 16 may, for example, be provided by a USB cable, or any other similar type of communications link suitable for enabling the currency changer device 14 to communicate with the point of sale terminal 12.

The currency changer device 14 is adapted to accept cash in bulk for a cash transaction. The currency changer device 14 is also adapted to dispense change in a cash transaction responsive to commands received from the point of sale terminal 12. The currency changer device 14 includes a housing 18. The housing 18 may be similar to a housing for a computer processing unit (CPU) or any other type of housing as understood by those skilled in the art.

The currency changer device 14 may also include a coin accepting tray 20 carried by the housing 18. The coin accepting tray 20 accepts a plurality of coins in bulk in a cash transaction. The currency changer device 14 may also include a coin sorter 22 carried by the housing 18. The coin sorter 22 is in communication with the coin accepting tray 20. More specifically, the coin sorter 22 sorts the plurality of coins that are deposited in bulk into the coin accepting tray 20 by a user. The coins are preferably sorted by denomination. After the coins are sorted in the coin sorter 22, the coins are deposited into a respective plurality of coin bins 24.

The coin bins 24 are preferably individual coin bins carried by the housing 18 in communication with the coin sorter 22 for receiving a respective plurality of similar denomination coins. The coin bins 24 preferably include a first coin bin 24a for pennies, a second coin bin 24b for nickels, a third coin bin 24c for dimes, and a fourth coin bin 24d for quarters. Those skilled in the art, however, will appreciate that any type of coin bins may be included for any type of currency, i.e., U.S., or other currency. Further, additional coin bins may be included to accept other types of coins, such as 50-cent pieces, and dollar coins, as understood by those skilled in the art.

The currency changer device 14 may also include a coin rejection dispenser 26 in communication with the coin accepting tray 20. The coin rejection dispenser advantageously dispenses coins rejected by the currency changer device. Such coins are likely invalid coins, or coins not accepted as currency by the currency changer device 14. Accordingly, the currency changer device 14 of the present invention advantageously prevents fraudulent coins from being deposited as payment in a cash transaction.

The currency changer device 14 also includes a coin dispenser 28 carried by the housing 18. The coin dispenser 28 is in communication with the plurality of respective coin bins 24 to dispense coins responsive to the point of sale terminal 12. More particularly, the coin dispenser 28 dispenses the proper amount of coins as determined by a point of sale terminal 12. In other words, during a cash transaction, the point of sale terminal 12 determines the amount of change due to a user after the user deposits cash for payment of the cash transaction. Therefore, after the amount of change is calculated by the point of sale terminal 12, the proper number of coins necessary for dispensing the proper amount of change is dispensed through the coin dispenser 28.

The currency changer device 14 also includes a bill accepter 30 carried by the housing 18 for accepting and sorting a plurality of bills in bulk. In other words, the bill accepter 30 allows a user to deposit a plurality of unsorted bills into the currency changer device 14 in a cash transaction. After the plurality of unsorted bills are deposited into the bill accepter 30, the plurality of unsorted bills are sorted and routed to a plurality of bill cassettes 32 carried by the housing 18 in communication with the bill accepter 30. The plurality of bill cassettes 32 receive a respective plurality of similar denomination bills from the bill accepter 30. The bill cassettes 32 may include a plurality of bill cassettes for receiving different denomination bills that have been sorted. More particularly, the bill cassettes may include a $1 bill cassette 32a for receiving $1 bills, a $5 bill cassette 32b for receiving $5 bills, a $10 bill cassette 32c for receiving $10 bills, and a $20 bill cassette 32d for receiving $20 bills.

Those skilled in the art will appreciate that the currency changer device 14 may also be adapted to receive $50 bills and $100 bills. These bills may, for example, be stacked in separate cassettes. It is preferable, however, that these denomination bills are not dispensed to users. Accordingly, security of cash stored within the currency changer device 14 is advantageously enhanced. Those skilled in the art will further appreciate that the currency changer device 14 is illustrated as having four bill cassettes, but may also include any number of bill cassettes for accepting any denomination bills, and any type of bills, i.e., U.S. bills and foreign bills.

The currency changer device 14 also includes a bill dispenser 34 in communication with each of the plurality of bill cassettes 32 and carried by the housing 18. The bill dispenser 34 dispenses a plurality of bills in response to the point of sale terminal. In other words, and similar to the process of accepting and dispensing coins described above, the point of sale terminal 12 determines the cost of merchandise, and the amount of change due in a cash transaction depending on the amount of cash deposited by a user. Upon a determination by the point of sale terminal 12 of the amount of change due to a user, the proper number of bills from each denomination may be dispensed from the bill cassettes through the bill dispenser 34.

Therefore, the currency changer device 14 of the drawerless point of sale system 10 of the present invention advantageously prevents access to cash by a user. This is advantageous for any type of user in any type of point of sale retail management system. In other words, the drawerless point of sale system 10 may advantageously be used in situations where an attendant is checking out goods, or it may also be used in a situation such as self-checkout. In any type of situation where a cash transaction is involved, the drawerless point of sale system 10 of the present invention advantageously prevents access to the cash held by the currency changer device 14.

Referring now additionally to FIGS. 2-6, additional aspects of the drawerless point of sale system 10 according to the present invention are now described in greater detail. More specifically, and as described above, a communications link 16 extends between the currency changer device 14 and the point of sale terminals 12. The communications link 16 advantageously allows the currency changer device 14 to communicate with the point of sale terminal 12. For example, the point of sale terminal 12 provides a signal to activate the currency changer device 14 upon a determination that cash will be used to process the sales transaction. Further, the communications link 16 is also used to provide data from the point of sale terminal 12 to the currency changer device 14. The data may, for example, include a predetermined amount of cash required to be tendered for a cash transaction and a predetermined amount of cash required to be dispensed to a user as change in the cash transaction.

Figure 6:
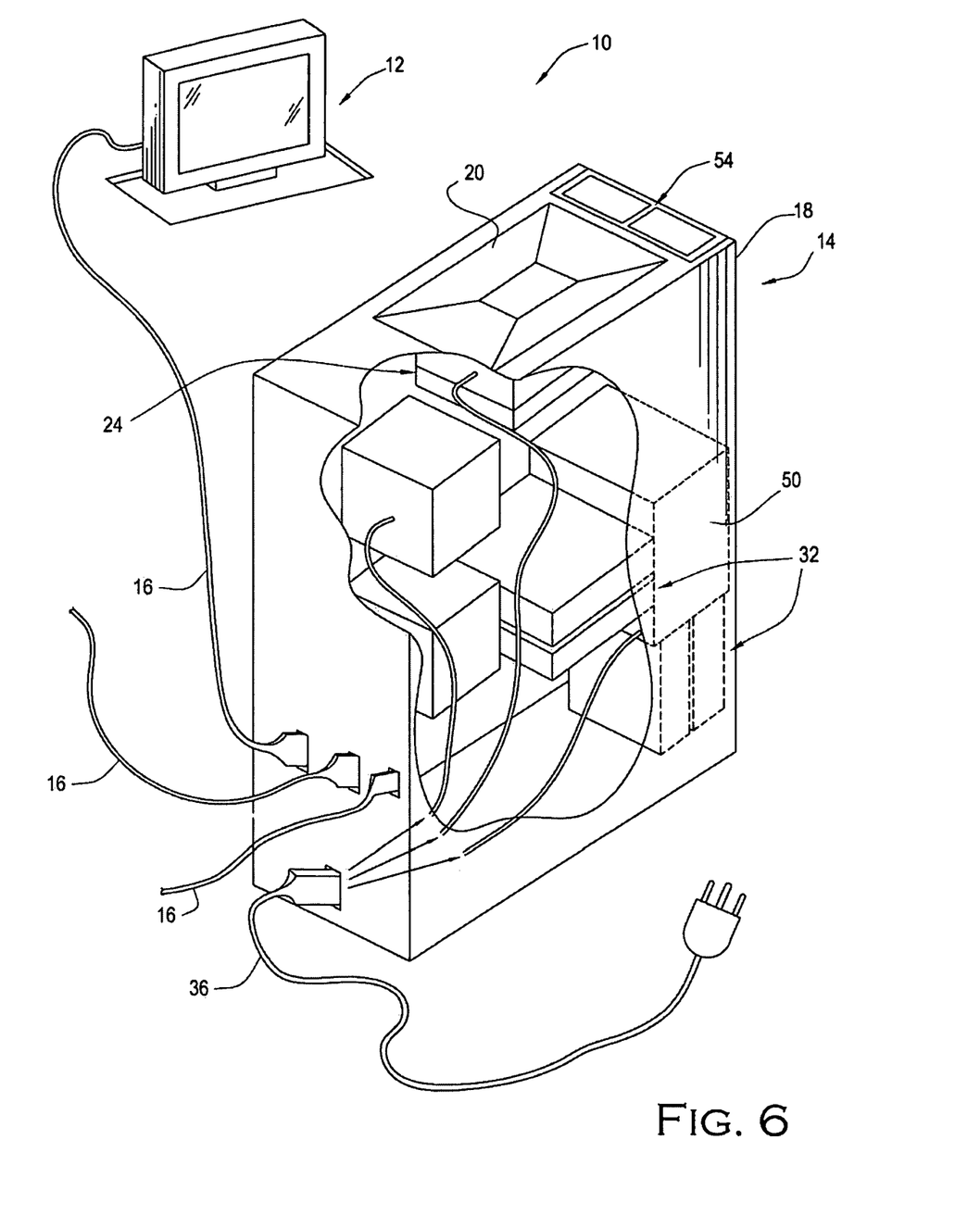
FIG. 6 is a perspective view of the currency changer device of the drawerless point of sale system illustrated in FIG. 1 and showing data connections between the currency changer device and the point of sale terminal.

Referring now more specifically to FIG. 6, a power supply 36 for the currency changer device 14 is now described in greater detail. The power supply 36 may be provided, for example, by either an AC power supply, i.e., plugged into a standard outlet, or a DC power supply, i.e., a self-contained power supply carried by the housing 18. Although the power supply 36 is illustrated in FIG. 6 as an AC power supply to be plugged into a wall, those having skill in the art will appreciate that the currency changer device 14 may include a self-contained power supply. Further, a plurality of power supplies 36 may be carried by the housing 18 to provide power to various components of the currency changer device 14. For example, a first power supply 36a may be provided to supply power to the coin sorter, coin dispenser, bill accepter, bill dispenser, and bill cassettes. The second power supply 36b may be used to supply power to the coin accepter. The third power supply 36c may be used to supply power to the communications router 38 carried by the housing 18 and in communication with the communications link 16 to the point of sale terminal 12.

Figure 3:
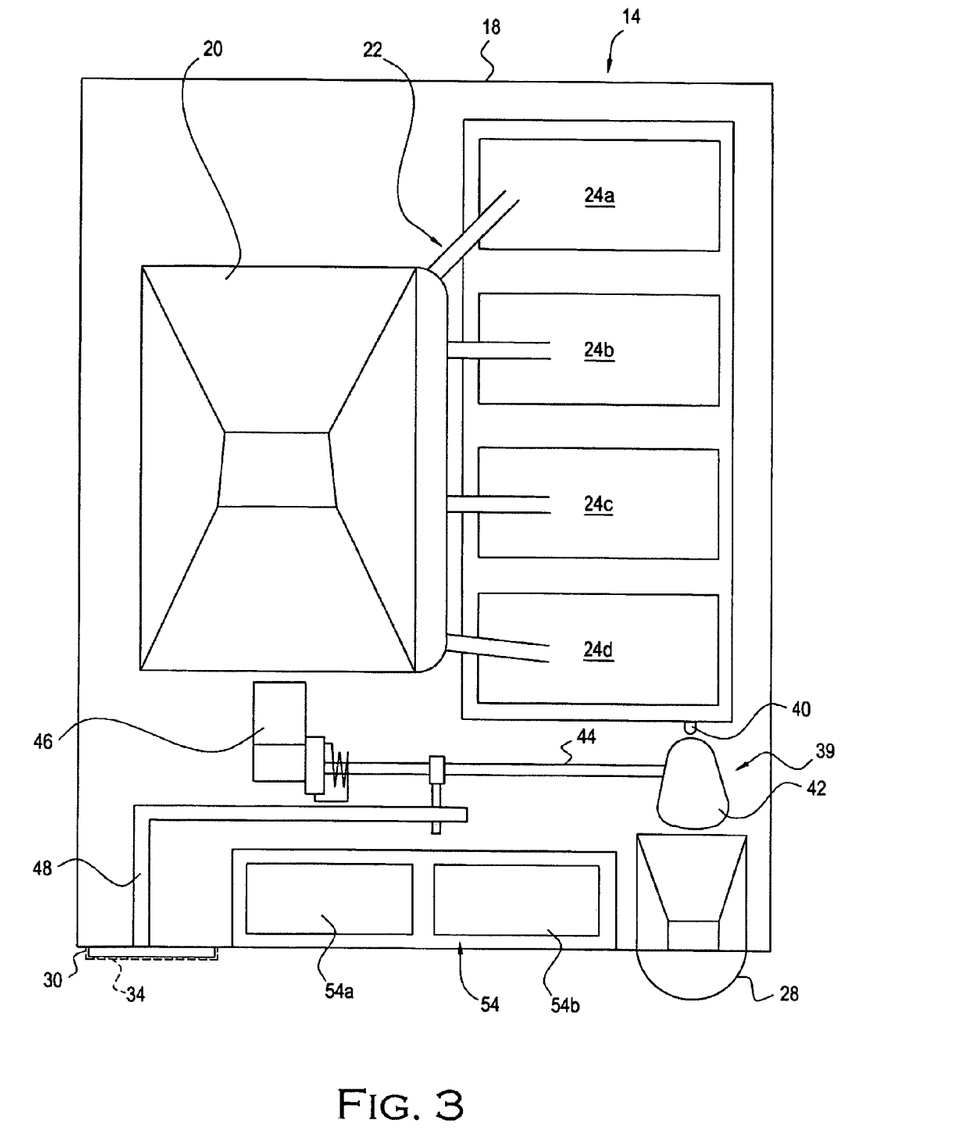
FIG. 3 is a schematic view of the currency changer device shown in FIG. 1 illustrating the function of the coin accepter, sorter and dispenser.

Referring now more specifically to FIG. 3, additional details of the coin accepting, sorting, and dispensing process are provided in greater detail. More specifically, as previously discussed above, the currency changer device 14 includes a coin accepting tray 20. The coin accepting tray 20 is illustratively provided by a hopper to allow a user to drop unsorted coins therein. The coin accepting tray 20 is in communication with a coin sorter 22 provided by a plurality of rails. The coin sorter 22 routes sorted coins to the coin bins 24.

Accordingly, similar denomination coins are positioned in the similar denomination coin bins 24a-24d. The coin bins are in communication with an internal coin dispenser 40. More specifically, the internal coin dispenser 40 is preferably characterized as an outlet for coins to be dispensed from the individual coin bins 24a-24d. The internal coin dispenser 40 is in communication with an internal coin cup 42. The internal coin cup 42 receives coins dispensed from the internal coin dispenser 40. The internal coin cup 42 is connected to a coin cup shaft 44 that allows for lifting and rotation of the internal coin cup to thereby dispense the coins into the cup of the coin dispenser 28 that is carried by the housing 18 of the currency changer device 14. More specifically, the coin cup shaft 44 is connected to a coin cup access pin which is positioned in communication with a linear actuator servo motor 46. A coin cup rotation initiation bar 48 is positioned to start the rotation of the coin cup shaft 44 until a linear actuator hits a top limit sensor and reverses direction to move back to an originating home position. Accordingly, as coins are dispensed from the internal coin dispenser 40 to the internal coin cup 42, the internal coin cup may be rotated to allow for the coins in the internal coin cup to be dispensed into the coin dispenser 28.

Figure 4:
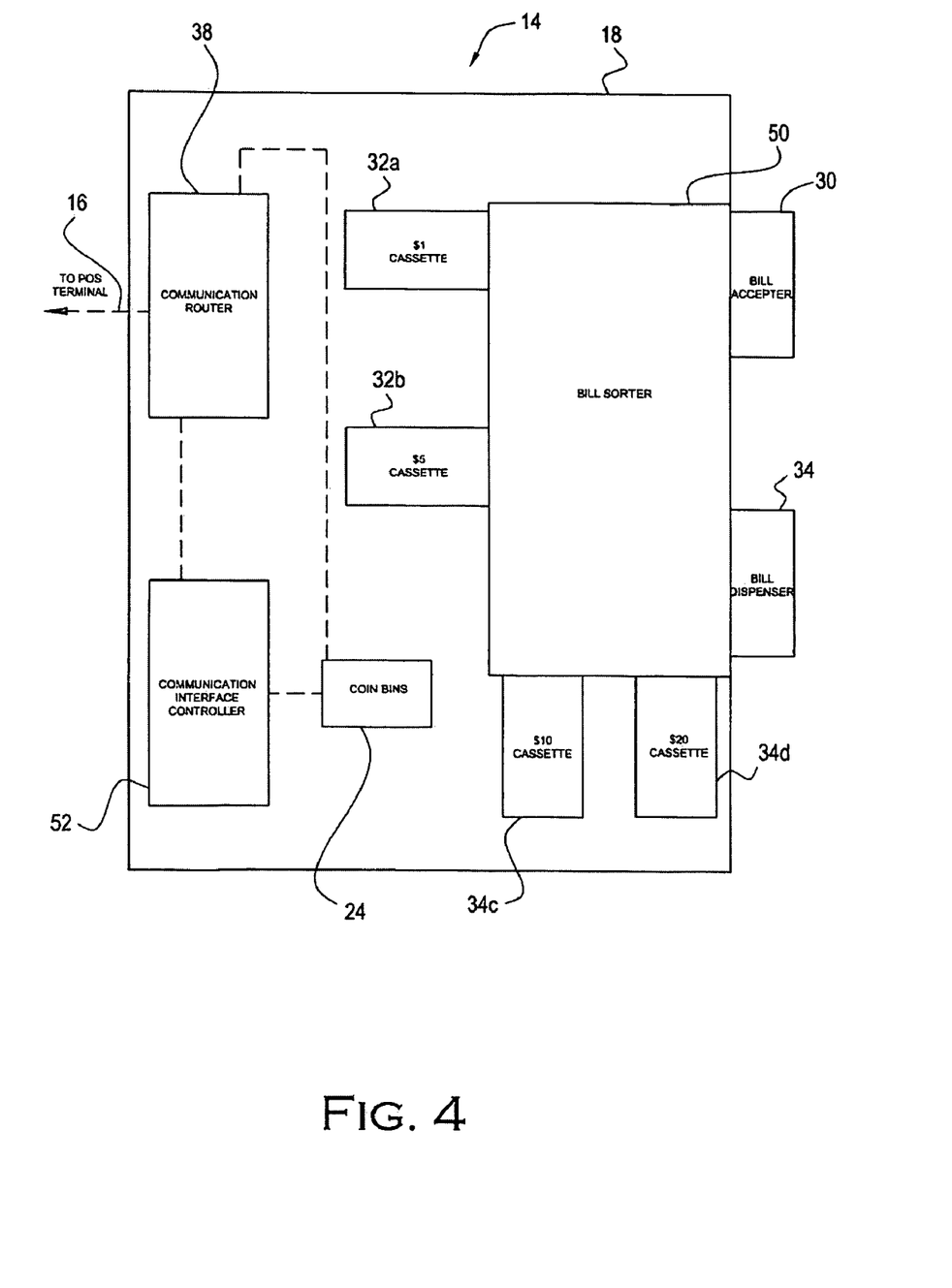
FIG. 4 is a schematic view of the currency changer device shown in FIG. 1 illustrating the function of the bill accepter, sorter and dispenser, and the communication therebetween.

Referring now more specifically to FIG. 4, additional details of the process of accepting and dispensing bills in the currency changer device 14 are now described in greater detail. As illustrated, the currency changer device 14 includes a bill accepter 30 and a bill dispenser 34. The bill accepter 30 is in communication with a bill sorter 50. Upon insertion of a plurality of bills, i.e., bank notes, in bulk, into the bill accepter 30, the plurality of bills are sorted in the bill sorter 50. More specifically, the plurality of bills are sorted and positioned in bill cassettes 32.

As illustrated, the bill cassettes 32 may include four separate bill cassettes 32a, 32b, 32c, 32d. As described above, the cassettes may be adapted to receive any type of currency, but when used for a cash transaction in the U.S., the bill cassettes are preferably adapted as a $1 bill cassette 32a, a $5 bill cassette 32b, a $10 bill cassette 32c, and a $20 bill cassette 32d. As also mentioned above, those having skill in the art will appreciate that the bill cassettes 32 may also advantageously include a $50 bill cassette and a $100 bill cassette (not shown), that are used to collect $50 bills and $100 bills, but adapted to prevent the $50 bills and the $100 bills from being dispensed.

The currency changer device 14 may also include a communications router 38. The communications router 38 is preferably in communication with the coin bins 24. More specifically, the communications router 38 is in communication with the communications link 16 to position the components of the currency changer device 14 in communication with the point of sale terminal 12. The currency changer device 14 also illustratively includes the communications interface controller 52 positioned in communication with the communications router 38. The communications interface controller 52 preferably obtains power from a power supply 36b, and a communications link exists between the communications interface controller 52 and all of the coin bins 24a-24d. In more simple terms, the communications link 16 between the point of sale terminal 12 and the currency changer device 14 uses communications protocol commands to command the currency changer device to perform various tasks, e.g., accept currency and dispense currency as change in a cash transaction.

Figure 2:
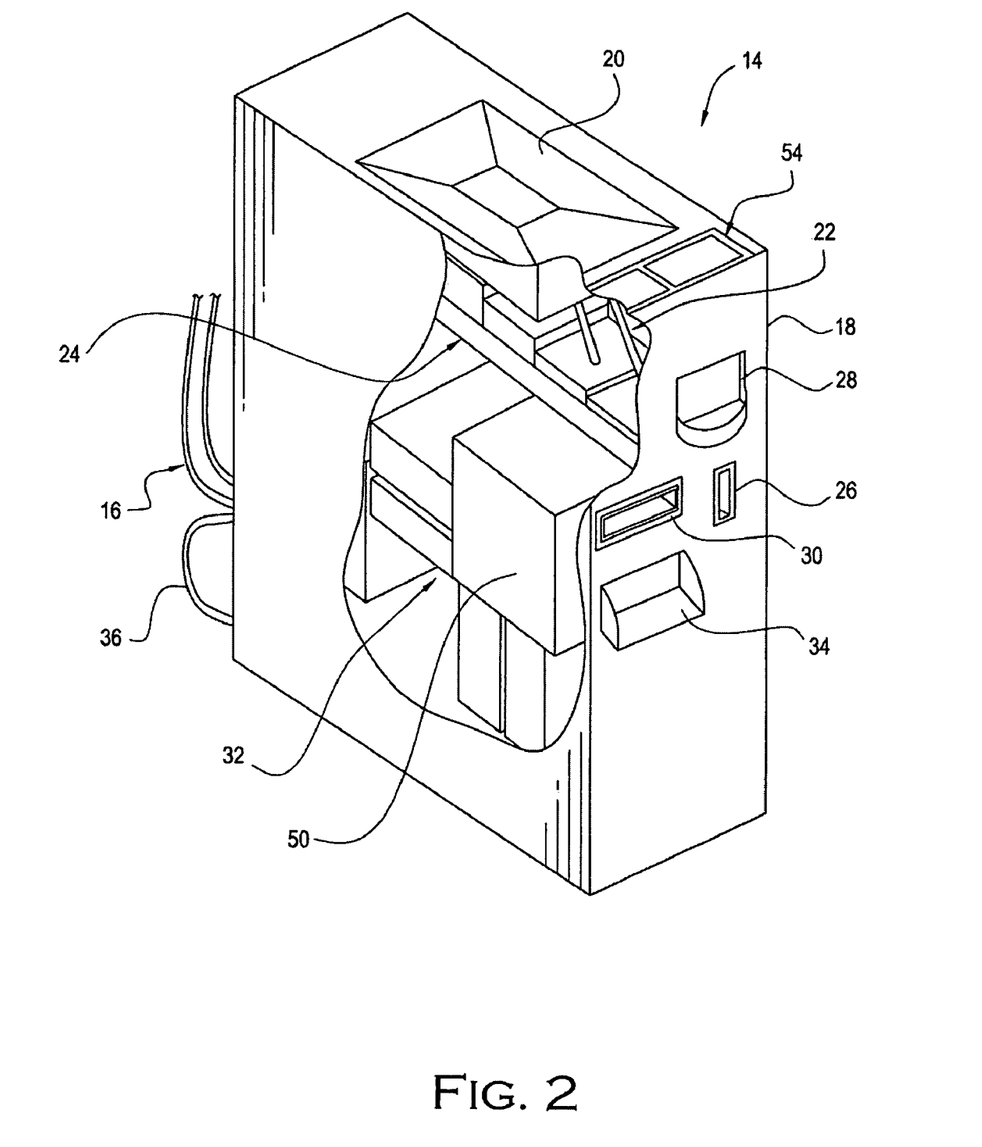
FIG. 2 is a perspective view of a currency changer device of the drawerless point of sale system shown in FIG. 1 having portions cut away.

As perhaps best illustrated in FIGS. 1-3, the currency changer device 14 also includes an indicator light 54 to provide an indication to a user that the currency changer device 14 is ready to accept currency. The indicator light 54 is preferably positioned adjacent a top surface 18 of the housing. Accordingly, the indicator light 54 may be readily visible by a user standing over the currency changer device 14.

The indicator light 54 may include a plurality of lights for providing a plurality of indications to a user. For example, a first light may be a red light indicating that the currency changer device 14 is not ready to receive currency, and a second light may be a green light indicating that the currency changer device 14 is ready to accept currency. Those skilled in the art will appreciate that any combination of indicator lights may be used to achieve the objects, features and advantages of the present invention.

The drawerless point of sale system may advantageously include a respective plurality of pressure pads (not shown) positioned on the floor adjacent the currency changer device 14. The plurality of pressure pads may be positioned in communication with the currency changer device 14. The plurality of pressure pads sense the presence of a user, such as an attendant at a point of sale terminal 12 or a user of a self checkout system. Accordingly, the pressure pads advantageously prevent the possibility of out-of-line cash insertion scenario. This mechanism prevents untrained attendants to make possible mistakes.

Figure 5:
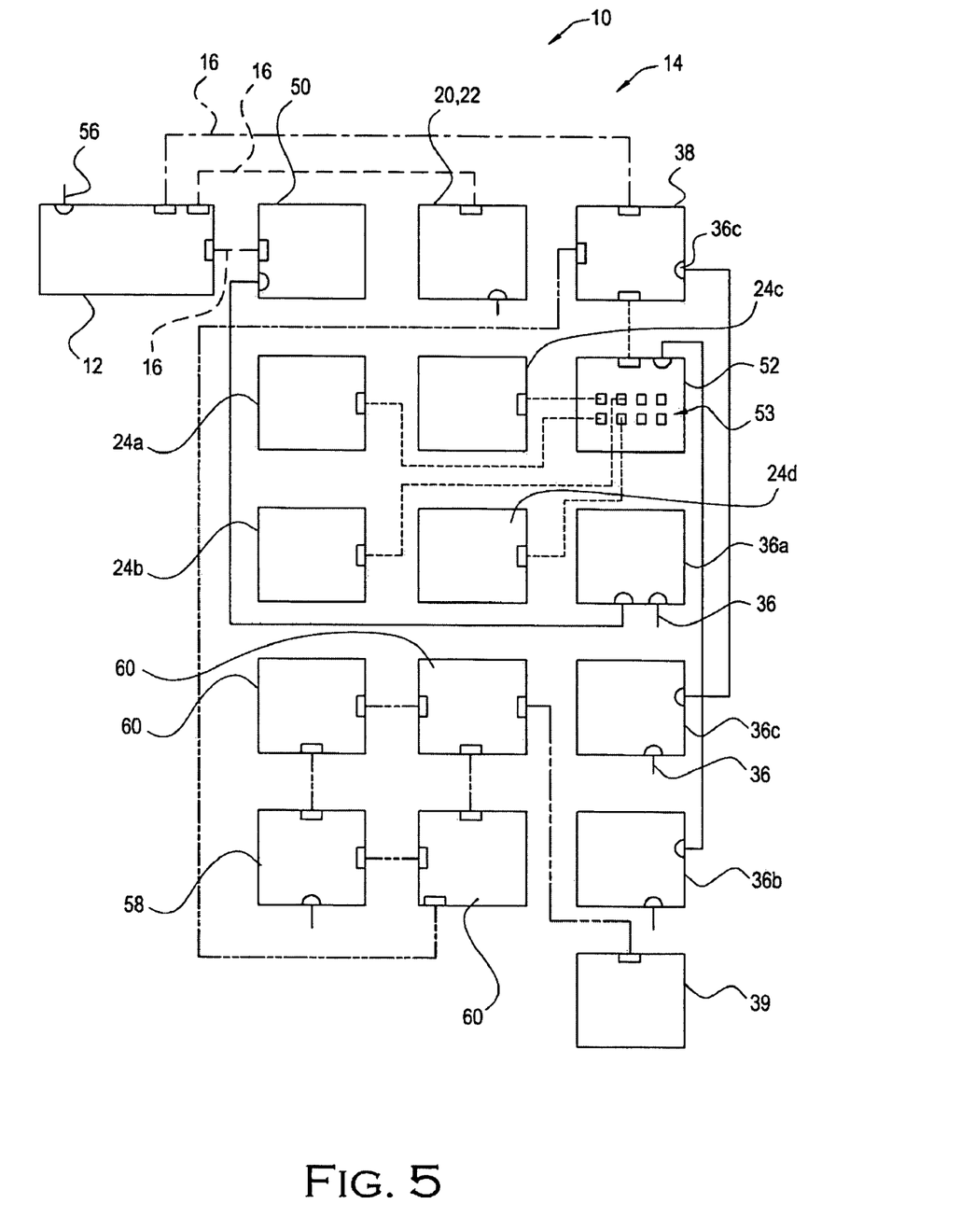
FIG. 5 is an electrical schematic showing communication between the components of the currency changer device illustrated in FIG. 1.

Referring now more specifically to FIG. 5, the electrical layout of the components of the drawerless point of sale system 10 are now described in greater detail. The point of sale terminal 12 may include a power supply 56 to provide power thereto. The power supply 56 for the point of sale terminal 12 is preferably an AC power connection. Those skilled in the art, however, will appreciate that any other type of power supply may be used to provide power to the point of sale terminal 12.

The point of sale terminal 12 is connected to the currency charger device 14. As illustrated, a plurality of communications links 16 send information between the point of sale terminal 12 and the currency changer device 14. More particularly, a USB interface may be positioned to extend between the point of sale terminal 12 and the communications router 38 carried by the housing 18 of the currency changer device 14. This USB interface link 16 is preferably used to provide commands to the coin dispenser. Further, an RS 232 currency management interface link 16 may be positioned to extend between the point of sale terminal 12 and the coin accepter/sorter 20 Another RS 232 interface 16 may extend from the point of sale terminal 12 to the bill sorter 50.

A communications interface controller 52 is positioned in communication with the communications router 38 using another interface link. The interface link between the communications router 38 and the communications interface controller 52 is preferably a CCTALK interface link. The communications interface controller 52 is also preferably positioned in communication with each of the coin bins 24a-24d via CCTALK interface links. More specifically, the communications interface controller 52 may be a CCTALK splitter 53 to provide the CCTALK connection between the communications interface controller 52 and the coin bins 24a-24d. Accordingly, the interconnections between the various devices are used to control operation of the coin dispensing features of the present invention.

The housing 18 of the currency changer device 14 also includes an AC power supply 36 connected to a paylink communications power supply, i.e., the communications router power supply 36c. The AC power supply 36 may be connected to the coin dispenser 28 and also to the communications router at the communications router power supply 36c. The system 10 of the present invention contemplates the use of software to control the operation of the currency changer device 14. More specifically, and as perhaps best illustrated in FIGS. 2-3, coins may be initially accepted and sorted by coin accepter 20 and the coin sorter 22. The coins may then be routed mechanically to the individual coin bins 24a-24d via the coin routing system 22. Software is preferably used to keep track of the quantity and denomination of coins deposited and keeps a running tally of the total number of coins in each coin bin. The power supply 36b for the coin bins 24a-24d is preferably in communication with the communications interface controller 52.

The currency changer device 14 also includes a motion controller module 58 and a plurality of motion controller relays 60. The motion controller module 58 and motion controller relays 60 are in communication with the communications router 38 and the coin lift mechanism 39. As discussed above, the coin lift mechanism 39 includes the internal coin cup 42, the coin cup shaft 44, the servo motor 46, and the coin cup rotation initiation bar 48 to tilt the internal coin cup so the coins are spilled into the external coin cup 28 to dispense coins. The motion controller relays 60 are positioned in communication with the communications router using a control logic link.

FIG. 6 illustrates the drawerless point of sale system 10 and the links between the point of sale terminal 12 and the currency changer device 14. The communications links between the point of sale terminal 12 and the currency changer device 14, as well as the power supplies 36 to the currency changer device 14 have been discussed in greater detail above.

As discussed above, the drawerless point of sale system 10 is preferably self-replenishing. In other words, as a user inserts currency into the currency changer device 14, the currency self replenishes in the coin bins 24 and the bill cassettes 32. Those skilled in the art will appreciate, however, that the currency changer device 14 will need to be initially stocked with currency. Further, there may be instances when a particular denomination of currency may run short. For example, the currency changer device 14 may run out of $1 bills being held in the $1 bill cassette 32a. Accordingly, an indication may be provided at the point of sale terminal 12 that the $1 bills need to be replenished. In a case when the currency changer device 14 is connected to a pair of point of sale terminals 12, as illustrated, for example, in FIG. 1, an indication needs to be provided to a user when the currency changer device 14 is ready to accept cash for their particular transaction.

For example, the point of sale terminals 12 may include a left side point of sale terminal and a right side point of sale terminal. When the currency changer device 14 is ready to receive currency from the left side point of sale terminal, for example, an indication may be provided on the point of sale terminal 12 so that the user is informed as to the status of the currency changer device. This indication is also advantageously enhanced using the indicator light 54 on the currency changer device. In other words, the indicator light 54 may provide another indication to the user that the currency changer device is ready to accept currency.

The indicator light 54 may, for example, be provided by a light emitting diode. More particularly, and as perhaps best illustrated in FIG. 3, the indicator light 54 may include a pair of indicator lights. The pair of indicator lights 54 may be used to provide indications to the respective pair of point of sale terminals 12 that are connected to the currency changer device 14. Therefore, a left side indicator light 54*a* may be used to provide an indication to a left side point of sale terminal, and a right side indicator light 54*b* may be used to provide an indication to the right side point of sale terminal.

The indicator light 54 may be adapted to provide different types of indications. For example, the indicator light may be illuminated red, for example, after the currency changer device 14 has been activated, but is not yet ready to accept currency. Further, the indicator light 54 may be illuminated green in a case where the currency changer device 14 is ready to accept currency. In a case where currency has been deposited into the currency changer device 14, and the currency changer device is busy, the indicator light 54 may be illuminated yellow. Those having skill in the art will appreciate that the indicator light 54 may be illuminated using a constant illumination, may be a flashing illumination, or any combination thereof.

Those having skill in the art will appreciate that the drawerless point of sale system 10 may also include a manual mode. In other words, the point of sale terminals 12 may, for example, include a cash drawer that may only be opened should the currency changer device 14 fail to properly operate. Of course, the manual mode would only be available for systems that use an attendant. In other words, there would be no accessibility to a cash drawer in a self check out system.

Figure 7:
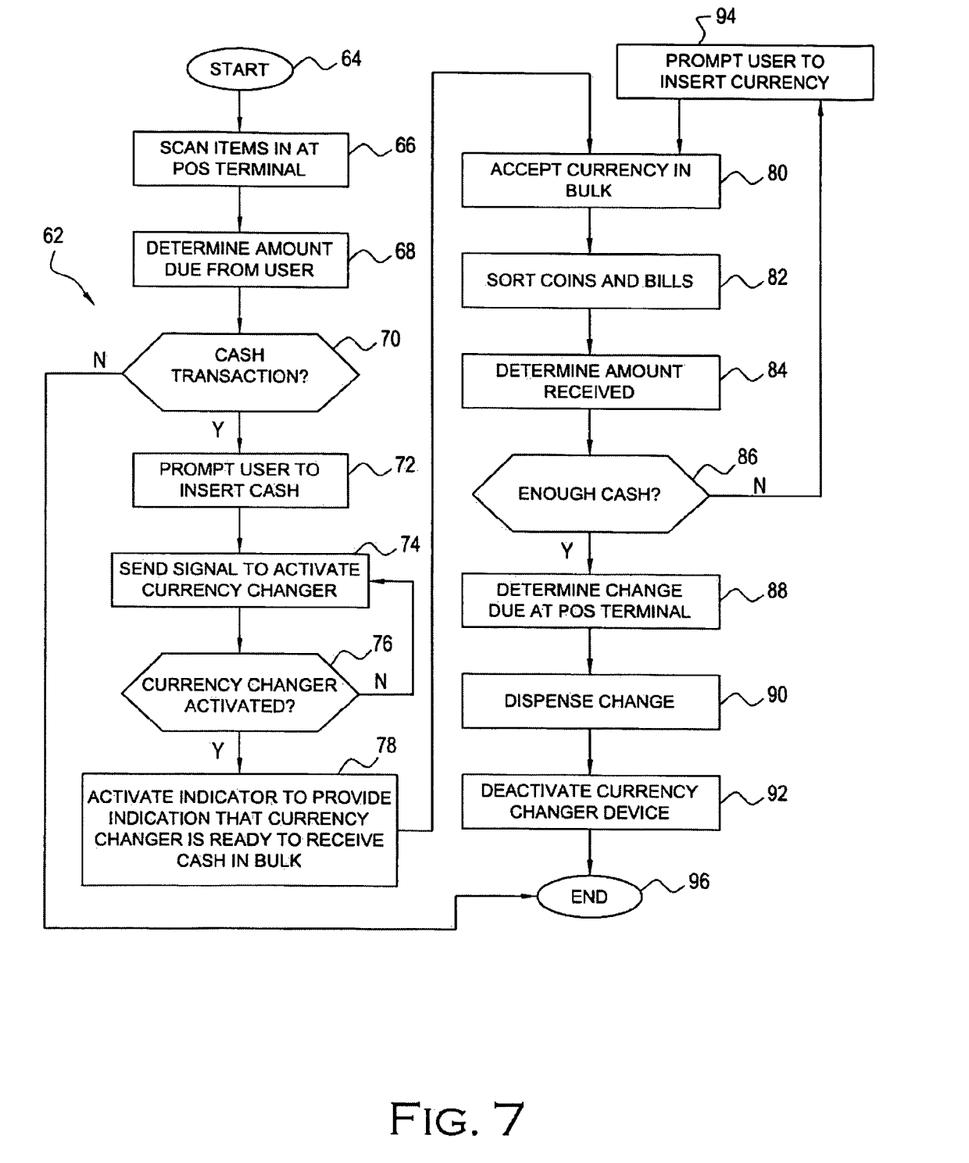
FIG. 7 is a flow chart describing a method of using a drawerless point of sale system according to the present invention.

Referring now additionally to the flow chart 62 of FIG. 7, a method aspect of the present invention is now described in greater detail. From the start (block 64), items are scanned in at the point of sale terminal 12 at block 66. At block 68, the amount due from the user is determined. At block 70, it is determined whether or not the transaction is a cash transaction. If it is determined that the transaction is not a cash transaction at block 70, then the method is ended at block 96. If, however, it is determined that the transaction is a cash transaction at block 70, then the user is prompted to insert cash at block 72.

At block 74, a signal is sent from the point of sale terminal 12 to the currency changer device 14 to activate the currency changer device. At block 76, it is determined whether the currency changer device is activated. If it is determined at block 76 that the currency changer device has not been activated, then the signal to activate the currency changer device is again sent at block 74. If, however, it is determined at block 76 that the currency changer device 14 has been activated, then the indicator light 54 is activated to provide an indication that the currency changer device 14 is ready to receive cash in bulk at block 78.

At block 80, currency is accepted in bulk. In other words, a plurality of unsorted coins and a plurality of unsorted bills are accepted into the currency changer device 14 in bulk. Therefore, there advantageously is no need for a user to separate in individually insert currency. Instead, the user may insert a plurality of unsorted currency simultaneously. Further, it is not necessary for a user to insert currency in any particular order. In other words, the user of the system 10 of the present invention may insert coins before bills, bills before coins, or bills and coins simultaneously.

At block 82, the currency that is deposited into the currency changer device 14 is sorted. More particularly, the coins and bills are sorted simultaneously. Therefore, those skilled in the art will appreciate that there is no priority to sorting coins over bills or bills over coins. The coins and bills are sorted simultaneously.

At block 84, the amount of currency inserted by the user is determined. At block 86, it is determined whether enough currency was deposited by the user. If it is determined at block 86 that enough currency was not deposited by the user, then the user is prompted to insert additional currency at block 94. Thereafter, currency is accepted in bulk at block 80, the currency is sorted at block 82, and it is again determined whether or not enough currency was received at block 86.

If it is determined at block 86 that enough currency was deposited into the currency changer device 14 by the user, then the amount of change due to the user, if applicable, is determined at the point of sale terminal 12 at block 88. At block 90, the change is dispensed by the currency changer device 14 to the user. The currency changer device is deactivated at block 92, and the method is ended at block 96.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A drawerless point of sale system comprising:
   at least one point of sale terminal; and
   a currency changer device in communication with said at least one point of sale terminal, said currency changer device adapted to accept cash in bulk for a cash transaction and to dispense change in a cash transaction responsive to commands received from said at least one point of sale terminal, said currency changer device comprising:
   a housing,
   a coin accepting tray carried by the housing for accepting a plurality of coins in bulk,
   a coin sorter carried by the housing and in communication with the coin accepting tray,
   a plurality of respective coin bins carried by the housing and in communication with the coin sorter for receiving a respective plurality of similar coins from the sorted coins,
   a coin dispenser carried by the housing and in communication with the plurality of respective coin bins to dispense coins responsive to said point of sale terminal, wherein the coin dispenser is positioned in communication with a coin cup to receive coins dispensed from the coin bins, and wherein the coin cup is in communication with a coin cup shaft that lifts and rotates the coin cup to dispense the coins in the coin cup, a bill accepter carried by the housing for accepting and sorting a plurality bills in bulk, a plurality of bill cassettes carried by the housing and in communication with the bill accepter for receiving a respective plurality of similar bills from the bill accepter and for dispensing a respective plurality of bills responsive to said point of sale terminal, and a bill dispenser carried by the housing and in communication with the plurality of bill cassettes for dispensing a plurality of bills wherein said at least one point of sale terminal provides a signal to activate said currency changer device;

wherein said currency changer device is self replenishing so that coins accepted into the plurality of coin bins through the coin accepting tray may be selectively dispensed through the coin dispenser and so that bills accepted into the plurality of bill cassettes may be selectively dispensed through the bill dispenser;

wherein said currency changer device simultaneously accepts the plurality of coins in bulk and the plurality of bills in bulk; and wherein said currency changer device simultaneously dispenses the plurality of coins in bulk and the plurality of bills in bulk.

2. A system according to claim 1 wherein said at least one point of sale terminal provides data to said currency changer device.

3. A system according to claim 2 wherein the data includes a predetermined amount of cash required to be tendered for a cash transaction, and a predetermined amount of cash to be provided to a user as change.

4. A system according to claim 1 wherein said currency changer device is adapted to be connected to at least one power supply carried by the housing of said currency changer device.

5. A system according to claim 1 further comprising a communications link between said at least one point of sale terminal and said currency changer device.

6. A system according to claim 1 wherein said currency changer device further comprises an indicator light to provide an indication to a user that said currency changer device is ready to accept currency.

7. A system according to claim 1 wherein said at least one point of sale terminal comprises at least a pair of point of sale terminals in communication with said currency changer device.

8. A system according to claim 1 wherein said at least one point of sale terminal comprises at least a pair of point of sale terminals in communication with said currency changer device; wherein said currency changer device is adapted to accept currency in bulk for a cash transaction and dispense currency in bulk for a cash transaction responsive to commands received from each of said point of sale terminals; and wherein said currency changer device further comprises an indicator light relating to each of the point of sale terminals to provide an indication to a user at one of the plurality of point of sale terminals that said currency changer device is ready to accept and dispense currency in bulk form the one of the plurality of point of sale terminals.

9. A drawerless point of sale system comprising:

a plurality of point of sale terminals; and a currency changer device comprising a housing, said currency changer device in communication with each of said plurality of point of sale terminals and adapted to accept currency in bulk for a cash transaction and to dispense currency in bulk as change in a cash transaction responsive to commands received from said at least one point of sale terminal;

wherein said currency changer device accepts a plurality of unsorted coins in bulk and a plurality of unsorted bills in bulk, sorts the unsorted coin and unsorted bills, and selectively dispenses a plurality of coins in bulk and bills in bulk as change in the cash transaction;

wherein each of the plurality of point of sale terminals provides a signal to activate said currency changer device to complete the cash transaction;

wherein said currency changer device is self replenishing so that coins accepted into the plurality of coin bins through the coin accepting tray may be selectively dispensed through the coin dispenser and so that bills accepted into the plurality of bill cassettes may be selectively dispensed through the bill dispenser;

wherein said currency changer device simultaneously accepts the plurality of coins in bulk and the plurality of bills in bulk;

wherein said currency changer device simultaneously dispenses the plurality of coins in bulk and the plurality of bills in bulk; and wherein said currency changer device comprises a coin dispenser carried by the housing and a coin accepting tray carried by the housing for accepting a plurality of coins, the coin dispenser being positioned in communication with a coin cup to receive coins dispensed from coin bins, and the coin cup being in communication with a coin cup shaft that lifts and rotates the coin cup to dispense the coins in the coin cup.

10. A system according to claim 9 wherein said currency changer device comprises a coin sorter carried by the housing and in communication with the coin accepting tray and a plurality of respective coin bins carried by the housing and in communication with the coin sorter for receiving a respective plurality of similar coins from the sorted coins.

11. A system according to claim 9 wherein said currency changer device comprises a bill accepter/dispenser carried by the housing for accepting, sorting and dispensing bills, and a plurality of bill cassettes carried by the housing and in communication with the bill accepter/dispenser for receiving a respective plurality of similar bills from the bill accepter and for dispensing a respective plurality of bills responsive to each of said plurality of point of sale terminals.

12. A system according to claim 9 wherein said at least one point of sale terminal provides data to said currency changer device; and wherein the data includes a predetermined amount of cash required to be tendered for a sale, and a predetermined amount of cash to be provided to a user as change.

13. A system according to claim 9 wherein said currency changer device is adapted to be connected to at least one power supply, and further comprising a communications link between each of said plurality of point of sale terminals and said currency changer device.

14. A system according to claim 9 wherein said currency changer device further comprises an indicator light to provide an indication to a user at one of the plurality of point of sale terminals that said currency changer device is ready to accept currency from the one of the plurality of point of sale terminals.

15. A method of using a drawerless point of sale system comprising at least one point of sale terminal and a currency changer device in communication with the at least one point of sale terminal, the currency changer device comprising a housing and being positioned in communication with the at least one point of sale terminal and adapted to accept cash in bulk for a cash transaction and to dispense change in a cash transaction, the method comprising:

activating the currency changer device by providing a signal from the, at least one point of sale terminal to the currency changer device;

determining a total amount of cash due in a cash transaction;

accepting currency in bulk responsive to commands received from the at least one point of sale terminal;

selectively dispensing currency in bulk as change to a user responsive to commands received from the at least one point of sale terminal     self replenishing the currency changer device by selectively dispensing cash that has been accepted by the currency changer device as the change to the user;

simultaneously accepting a plurality of coins and a plurality of bills in bulk; and     simultaneously dispensing the plurality of coins and the plurality of bills in bulk;

wherein the currency changer device comprises a coin dispenser carried by the housing and a coin accepting tray carried by the housing for accepting a plurality of coins, the coin dispenser being positioned in communication with a coin cup to receive coins dispensed from the coin bin; and the coin cup being in communication with a coin cup shaft that lifts and rotates the coin cup to dispense the coins in the coin cup.

16. A method according to claim 15 wherein accepting cash and dispensing change comprises accepting a plurality of unsorted coins and a plurality of unsorted bills, sorting the unsorted coin and unsorted bills, and dispensing change in the cash transaction.

17. A method according to claim 15 wherein the currency changer device comprises a coin sorter carried by the housing and in communication with the coin accepting tray, a plurality of respective coin bins carried by the housing and in communication with the coin sorter for receiving a respective plurality of similar coins from the sorted coins a bill accepter/dispenser carried by the housing for accepting, sorting and dispensing bills, and a plurality of bill cassettes carried by the housing and in communication with the bill accepter/dispenser for receiving a respective plurality of similar bills from the bill accepter and for dispensing a respective plurality of bills responsive to said point of sale terminal, and wherein the coin dispenser is in communication with the plurality of respective coin bins to dispense coins responsive to said point of sale terminal.

18. A method according to claim 15 further comprising providing data from the at least one point of sale to the currency changer device indicating the amount of cash required to be tendered for a sale, and a predetermined amount of cash to be provided to a user as change.

19. A method according to claim 15 wherein the at least one point of sale terminal comprises at least a pair of point of sale terminals in communication with the currency changer device; and further comprising accepting currency in bulk for a cash transaction and dispensing currency in bulk for a cash transaction responsive to commands received from each of the point of sale terminals; and further comprising providing an indication to a user of each of the respective point of sale terminals that the currency changer device is ready to accept currency.

\* \* \* \* \*